(12) United States Patent
Kim et al.

(10) Patent No.: US 9,912,491 B2
(45) Date of Patent: Mar. 6, 2018

(54) SYSTEM AND METHOD FOR DISPLAYING DOCUMENT CONTENT USING UPNP

(75) Inventors: Ji-Hyeok Kim, Incheon (KR);
Won-Sang Kwon, Seoul (KR);
Tae-Hwan Hwang, Gyeonggi-do (KR);
Ki-Chul Park, Gyeonggi-do (KR);
Yoon-Suk Choi, Daejon (KR)

(73) Assignee: Samsung Electronics Co., Ltd (KR)

( * ) Notice: Subject to any disclaimer, the term of this patent is extended or adjusted under 35 U.S.C. 154(b) by 1351 days.

(21) Appl. No.: 12/977,466

(22) Filed: Dec. 23, 2010

(65) Prior Publication Data

US 2011/0154195 A1  Jun. 23, 2011

(30) Foreign Application Priority Data

Dec. 23, 2009  (KR) .................. 10-2009-0130094

(51) Int. Cl.
*G06F 17/00* (2006.01)
*H04L 12/28* (2006.01)
(Continued)

(52) U.S. Cl.
CPC .......... *H04L 12/2812* (2013.01); *G06F 17/21* (2013.01); *G06F 17/211* (2013.01);
(Continued)

(58) Field of Classification Search
CPC ...... G06F 17/21; G06F 17/211; G06F 17/212; H04L 12/2812; H04L 12/2807; H04L 65/601
(Continued)

(56) References Cited

U.S. PATENT DOCUMENTS

| 2003/0081846 A1* | 5/2003 | Whitehead | H04N 1/64 382/239 |
| 2003/0090510 A1* | 5/2003 | Shuping | G06F 17/30873 715/738 |

(Continued)

FOREIGN PATENT DOCUMENTS

| CN | 1941785 | 4/2007 |
| CN | 101095135 | 12/2007 |

(Continued)

OTHER PUBLICATIONS

Ritchie et al, "UPnP AV Architecture:1", Jun. 25, 2002, UPnP Forum, 22 pages.*

(Continued)

*Primary Examiner* — Cesar Paula
*Assistant Examiner* — David Faber
(74) *Attorney, Agent, or Firm* — The Farrell Law Firm, P.C.

(57) ABSTRACT

A system and method for displaying document content using Universal Plug and Play (UPnP) is provided. A media server provides meta information corresponding to the document content to a control point if a user request for displaying the document content is received, the control point provides the meta information of the document content to a media renderer that can display the requested document content together with an operation performance command for displaying the requested document content, and the media renderer receives the document content from the media server and renders the document content in accordance with the operation performance command to display the document content on a screen.

12 Claims, 5 Drawing Sheets

(51) Int. Cl.
*G06F 17/21* (2006.01)
*H04L 29/06* (2006.01)

(52) U.S. Cl.
CPC ........ *G06F 17/212* (2013.01); *H04L 12/2807* (2013.01); *H04L 65/601* (2013.01)

(58) Field of Classification Search
USPC ........................................ 715/200, 273, 255
See application file for complete search history.

(56) References Cited

U.S. PATENT DOCUMENTS

| | | | |
|---|---|---|---|
| 2004/0008226 A1* | 1/2004 | Manolis | G03D 15/005 715/769 |
| 2004/0243694 A1 | 12/2004 | Weast | |
| 2005/0135341 A1 | 6/2005 | Kim | |
| 2005/0166153 A1* | 7/2005 | Eytchison | G06F 3/0482 715/747 |
| 2005/0283814 A1* | 12/2005 | Scott | H04N 7/17318 725/115 |
| 2006/0036672 A1 | 2/2006 | Cha et al. | |
| 2006/0089981 A1* | 4/2006 | Ahn | H04L 67/16 709/221 |
| 2006/0242157 A1* | 10/2006 | McCuller | H04L 69/04 |
| 2007/0079000 A1 | 4/2007 | Yoon et al. | |
| 2007/0198669 A1* | 8/2007 | Convertino | H04L 12/2807 709/220 |
| 2007/0271310 A1 | 11/2007 | Han et al. | |
| 2008/0092211 A1* | 4/2008 | Klemets | H04L 63/0823 726/3 |
| 2009/0024717 A1* | 1/2009 | Im | 709/218 |
| 2009/0150570 A1* | 6/2009 | Tao | H04L 67/06 709/249 |
| 2009/0193474 A1* | 7/2009 | Stein | H04L 12/2812 725/82 |
| 2009/0300639 A1 | 12/2009 | Hamilton, II et al. | |
| 2010/0121942 A1* | 5/2010 | Ooi | H04N 7/17318 709/219 |
| 2010/0185987 A1* | 7/2010 | Yang | G06F 17/30274 715/838 |
| 2010/0332565 A1* | 12/2010 | Al-Shaykh | G06F 17/30905 707/912 |
| 2010/0332994 A1* | 12/2010 | Istvan | H04N 5/44543 715/740 |

FOREIGN PATENT DOCUMENTS

| | | |
|---|---|---|
| KR | 1020050062275 | 6/2005 |
| KR | 1020050062849 | 6/2005 |
| KR | 1020060015378 | 2/2006 |
| WO | WO 2005/002139 | 1/2005 |

OTHER PUBLICATIONS

Rankin, Bob; "Wireless PC to TV", published Jun. 1, 2009; 2 pages.*
SearchMobileComputing.com. "802.11", version provided online as of Oct. 20, 2000, 6 pages.*
UPnP Forum, "UPnP Device Architecture 1.1", published Oct. 15, 2008, 136 pages http://upnp.org/specs/arch/UPnP-arch-DeviceArchitecture-v1.1.pdf.*
Webopedia.com, display screen (Definition), Dec. 6, 2009, 1 page https://web.archive.org/web/20091206064539/http://www.webopedia.com/TERM/D/display_screen.html.*
"UPnP AV Architecture: 1", Internet Citation, XP003024273, Jun. 25, 2002, 22 pages.
Chinese Office Action dated Dec. 10, 2014 issued in counterpart application No. 201010602965.X, 16 pages.
Korean Office Action dated Sep. 30, 2015 issued in counterpart application No. 10-2009-0130094, 8 pages.
European Search Report dated Nov. 3, 2016 issued in counterpart application No. 10194100.3-1874, 5 pages.

* cited by examiner

SYSTEM AND METHOD FOR DISPLAYING DOCUMENT CONTENT USING UPNP

PRIORITY

This application claims priority under 35 U.S.C. § 119(a) to an application entitled "System And Method For Displaying Document Content Using UPnP" filed in the Korean Industrial Property Office on Dec. 23, 2009 and assigned Serial No. 10-2009-0130094, the entire contents of which are incorporated herein by reference.

BACKGROUND OF THE INVENTION

1. Field of the Invention

The present invention relates generally to a system and method having a document viewer function, and more particularly, to a system and method for displaying document content using Universal Plug and Play (UPnP).

2. Description of the Related Art

A home network is generally composed of an Internet Protocol (IP)-based private network, which connects and controls various kinds of appliances used at home, such as a Personal Computer (PC), an intelligent device, a wireless appliance, etc., in a network through a common virtual computing environment called middleware.

Middleware connects diverse digital appliances in through peer-to-peer connections and enables the appliances to communicate with one another. Home Audio Video Interoperability (HAVI), UPnP, Java Intelligent Network Infra-structure (JIVI), Home Wide Web (HWW), etc., have been proposed as middleware.

In a computing environment including UPnP middleware, respective appliances are allocated with addresses from a server according to a Dynamic Host Configuration Protocol (DHCP) or addresses selected by an auto Internet Protocol (IP) designation function. The respective appliances communicate with each other and search or inquire on the network through the allocated addresses.

The UPnP network, which is a commonly used home network technology, defines UPnP devices and UPnP services and defines protocols among them. The UPnP network is composed of Controlled Devices (CDs), which are home network appliances that are connected to an IP-based home network to be controlled, and a Control Point (CP), which is an appliance for controlling the controlled devices. More specifically, the control point is a device that controls the controlled devices, and is a constituent element that requests and receives an event. The controlled device performs a predetermined function according to a request of the control point, and is a constituent element that sends the event to the control point that has requested the event when the state of the controlled device is changed.

Operations performed by appliances of a UPnP network include an advertisement process, a discovery process, a description process, a control process, and an eventing process.

The advertisement process is a process in which a new controlled device connects to the home network and informs other devices on the home network of the new controlled device itself. The discovery process is a process in which a new control point connects to the home network and searches for other controlled devices operating on the home network. The description process is a process in which the control point, in order to control the newly added controlled device, obtains, in more detail, functions of the newly added device by parsing a service description eXtensible Markup Language (XML) file or a device description XML file through an IP address of the controlled device obtained in the discovery process. The control process is a process in which the control point, which intends to provide a specified service through the controlled device, transmits a control message (i.e., an "action request") for requesting a predetermined service using Simple Object Access Protocol (SOAP) in accordance with the UPnP device architecture to the corresponding controlled device, and receives a response message (i.e., "result, variable value"). An eventing process is a process of confirming the information change state of the controlled device that has provided the predetermined service in accordance with the control command transmitted from the control point.

UPnP Audio/Video (AV) transport service technology for enjoying multimedia content, such as audio, video, etc., based on the above-described UPnP technology is described in the UPnP AV specification.

According to the UPnP specification, the UPnP Audio/Video Transport Service (AVTS) architecture defines an operation related to the transmission of audio and video stream, and defines a common A/V transport mechanism that is suitable to a general User Interface (UI) environment. The UPnP AVTS architecture is applicable to a generally used medium, such as a disc, a tape, a compact disc, a Video Cassette Recorder (VCR) cassette, or a Motion Picture Experts' Group Audio Layer—3 (MP3) file.

Figure 1:
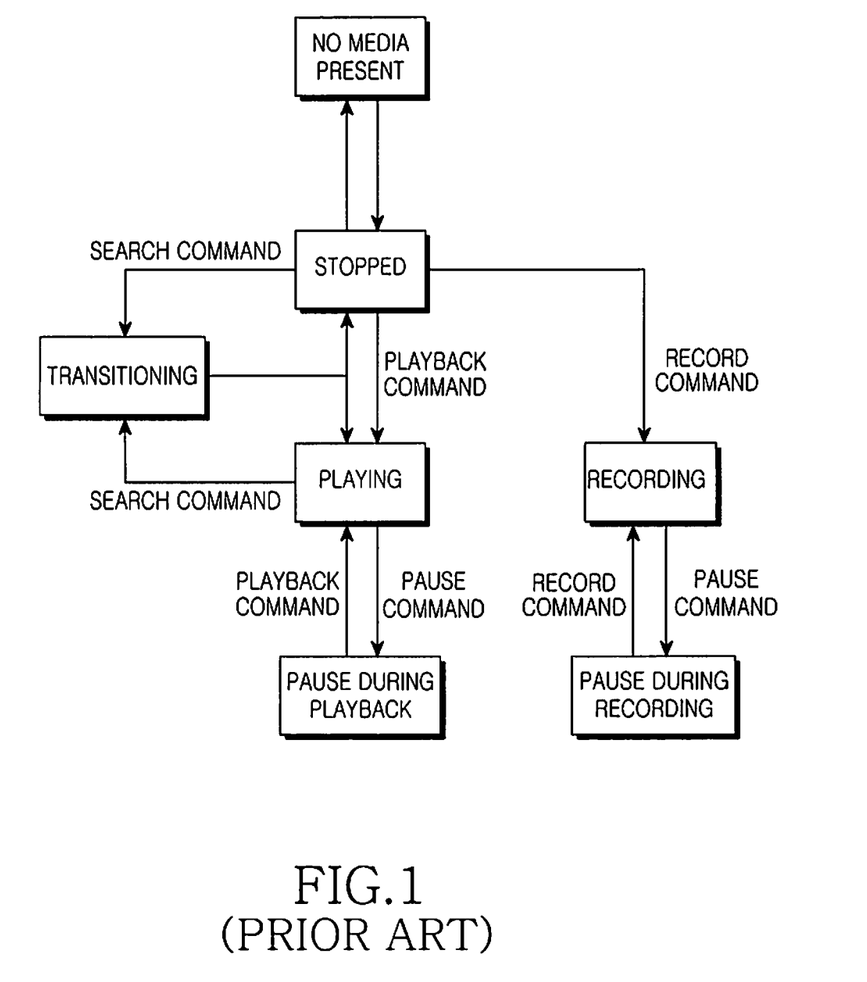
FIG. 1 is a diagram illustrating a conventional media rendering process in UPnP AVIS architecture.

Specifically, the UPnP AVTS architecture includes a media server providing a multimedia file through a content directory service, a media renderer rendering the provided multimedia file, and the control point controlling the media server and the media renderer, in order for the media server and the media renderer co-operate with each other. The content directory service is a service built into the media server, and provides, to the control point, meta data of content that exists in/out of the home network or is stored in the media server. The control point requests the media renderer to perform rendering by confirming the meta data from the content directory service. For example, as illustrated in FIG. 1, the UPnP AVTS architecture basically performs command operations, such as "PLAY", "STOP", and "PAUSE" through commands composed of state variables, such as "NO_MEDIA_PRESENT", "STOPPED", "PLAYING", "TRANSITIONING", and "PAUSING".

As described above, according to the UPnP AVTS architecture, the media renderer renders the multimedia file such as audio and video stream provided from the media server, and the control point controls the media renderer and the media server.

However, the conventional UPnP AVTS architecture can only render the multimedia files such as audio and video streams, but does not support a document viewer function for viewing text and documents. Accordingly, there is a need for the document viewer function.

Also, in order to add a document viewer function, the UPnP AVTS architecture may add a state variable for supporting the document viewer by extending the specification of the control point.

However, in the case where a plurality of control points including the UPnP control point and another extended control point both exist within a single appliance, there is a difficulty in that the media renderer must transmit AVTS-related event that occurs in the media renderer itself to all clients.

In addition, transmission of an event that is not related to AVTS may cause a control unit of the control point to malfunction, and according to conventional methods a new function may not be added by merely extending the existing AVTS architecture.

SUMMARY OF THE INVENTION

Accordingly, the present invention has been made to solve the above-mentioned problems occurring in the prior art, and the present invention provides a system and method for rendering document content in a UPnP network.

In accordance with an aspect of the present invention, a device for displaying document content using Universal Plug and Play (UpnP) is provided. The device includes a display for displaying a document content image; a document viewer service notification listener for identifying a media renderer that can render and display requested document content; a document viewer service last change event listener for receiving last change event information corresponding to an operation performed by the media renderer in accordance with an operation state command; and a document viewer controller for generating the operation state command, which is for rendering and displaying the document content in accordance with a user request for displaying the document content, and for transferring, to the media renderer, which is confirmed through the document viewer service notification listener, the generated operation state command, meta information provided from a media server, and display information of the display.

In accordance with another aspect of the present invention a device for displaying document content using Universal Plug and Play (UPnP) is provided. The device includes a document viewer service module for downloading requested document content that corresponds to meta information from a media server, performing an operation corresponding to the document content in accordance with an operation state command received from a control point, generating last change event information corresponding to a state of the performed operation, and transferring the generated last change event information to the control point; and a display for displaying the requested document content.

In accordance with another aspect of the present invention, a method for displaying document content using Universal Plug and Play (UPnP) is provided. The method includes if a user request for displaying the document content is input, rendering the document content in accordance with the request; identifying a media renderer that can render and display the requested document content; generating an operation state command for displaying the rendered document content; and transmitting, to the media renderer, the generated operation state command, meta information provided from a media server, and display information.

In accordance with another aspect of the present invention, a method for displaying document content using Universal Plug and Play (UPnP) is provided. The method includes downloading, from a media server, document content corresponding to meta information; performing an operation corresponding to the downloaded document content in accordance with an operation state command received from a control point; generating last change event information corresponding to a state of the performed operation; transferring the generated last change event information to the control point; and displaying the downloaded document content.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description of the present invention, a detailed description of known functions and configurations incorporated herein will be omitted when it may make the subject matter of the present invention rather unclear.

Figure 2:
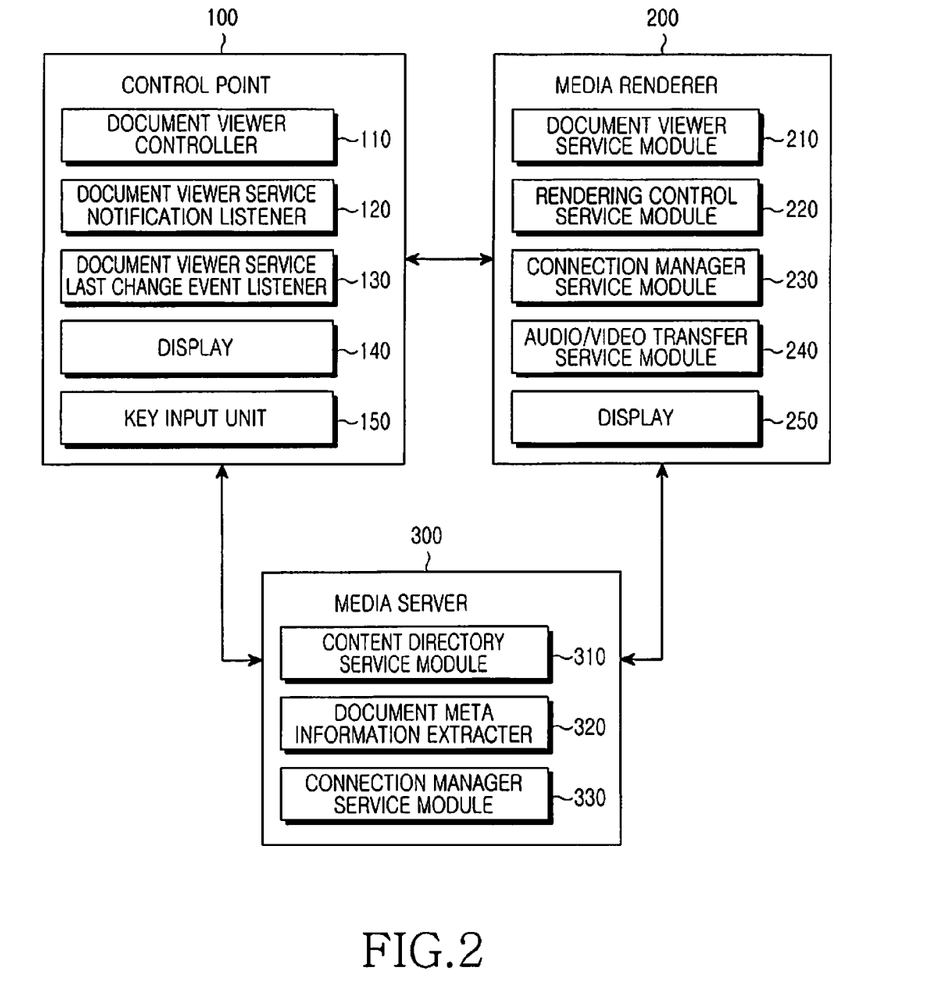
FIG. 2 is a diagram illustrating the configuration of a system for displaying document content according to an embodiment of the present invention.

FIG. 2 is a diagram illustrating the configuration of a system for displaying document content according to an embodiment of the present invention.

The system according to an embodiment of the present invention includes a control point 100, a media renderer 200, and a media server 300.

The control point 100 controls search, content browsing, and content rendering of the media renderer 200 and the media server 300. The control point 100 searches the media renderer rendering document content in accordance with a request for displaying the document content. Thereafter, the control point 100 transfers an operation performance command for displaying the document content, display information such as a display screen size, which is the size of a displayable area of the control point itself, and meta information on the requested document content to the searched media renderer 200. In the present example, the meta information includes a plurality of related information such as a title, the number of pages, and an author of the document content.

If state information of the media renderer 200 and a document content image are received from the media renderer 200 in accordance with the operation performance command, the control point 100 displays the received state information or the document content image on the screen. In the present example, the document content image is an image that has been converted into a form suitable to the display information of the control point 100.

The media renderer 200 broadcasts a message indicating that the document content can be rendered over the network to which the media renderer 200 itself belongs. If there is a request for rendering the document content, the media renderer 200 downloads the corresponding document content from the media server using the meta information on the requested document content. Thereafter, the media renderer renders the downloaded document content and displays the document content on the screen.

The media renderer 200 informs the control point 100 of the operation state of the media renderer 300 according to an operation command received from the control point 100. For example, if the command for document rendering is transferred from the control point 100, the media renderer 200 renders the document content to display the document content on the screen, and at this time, transfers, to the control point 100, the state information indicating that the current media renderer 200 is performing rendering.

The media server 300 reads document content existing in the memory, generates meta information that includes resource information of the read document content, and provides the document content to the media renderer 200 in response to a request. According to alternative embodiments of the present invention, the media server 300 may be configured in one device together with the control point 100, or may be configured in one device together with the media renderer 200.

The control point 100, the media renderer 200, and the media server 300 of FIG. 1 are described in more detail as follows.

The control point 100 includes a document viewer controller 110 (or processor), a document viewer service notification listener 120, a document viewer service last change event listener 130, a display 140, and an interface 150.

The document viewer controller 110 acquires meta data for the requested document content by browsing the media server 300 in accordance with the request for displaying the document content. Then, the document viewer controller 110 searches the media renderer 200 rendering the document content.

If the document viewer controller 110 receives notification information indicating that the document content can be rendered by the media renderer 200, the document viewer controller 110 confirms through the document viewer service notification listener 120 that the media renderer 200 that has transmitted the notification information can render the document content.

If the document viewer service notification listener 120 confirms that the media renderer can render the document content, the document viewer controller 110 transmits a command for displaying the document content, display information on the display 140, and the acquired meta data to the media renderer 300.

The document viewer controller 110 receives the last change event of the media renderer through the document viewer service last change event listener 130. The term "last change event" refers to state information on the operation performed by the media renderer. For example, the last change event refers information indicating an operation that is currently performed by the media renderer, such as document content open, document content downloading, and document content rendering.

Thereafter, if a document content image with a size suitable for the display 140 of the control point 100 is received from the media renderer 200, the document viewer controller 110 displays the received document content image on the display 140. A user may also enlarge or reduce the size of the document content image displayed on the display 250 of the media renderer 200 using a key input unit 150 of the control point 100.

The document viewer service notification listener 120 identifies whether the corresponding media renderer 200 can display the document content by confirming the notification information received from the media renderer 200, and informs the document viewer controller 110 of the result of identification.

The document viewer service last change event listener 130 receives the operation last change event of the media renderer 200 if a response to the command related to the document content display is received.

The display 140 displays the document content image received from the media renderer 200 or the operation last change event of the media renderer 200.

The key input unit 150 is provided with keys for inputting a request for displaying the document content and a request for controlling the document content from the user, and transfers a signal according to the input to the document viewer controller 110.

The media renderer 200 also includes a document viewer service module 210 (or processor), a rendering control service module 220, a connection manager service module 230, an audio/video transfer service module 240, and a display 250.

The document viewer service module 210 performs an operation for displaying the document content in accordance with a command for displaying the document content. For example, if a command for displaying the document content is received, the document viewer service module 210 downloads the document content from the media server 300, and opens and displays the downloaded document content through the display 250. If a command for displaying the next page of the document content is received from the control point 100, the document viewer service module 210 renders the next page in accordance with the command, and displays the next page of which the rendering is completed on the display 250.

Figure 3:
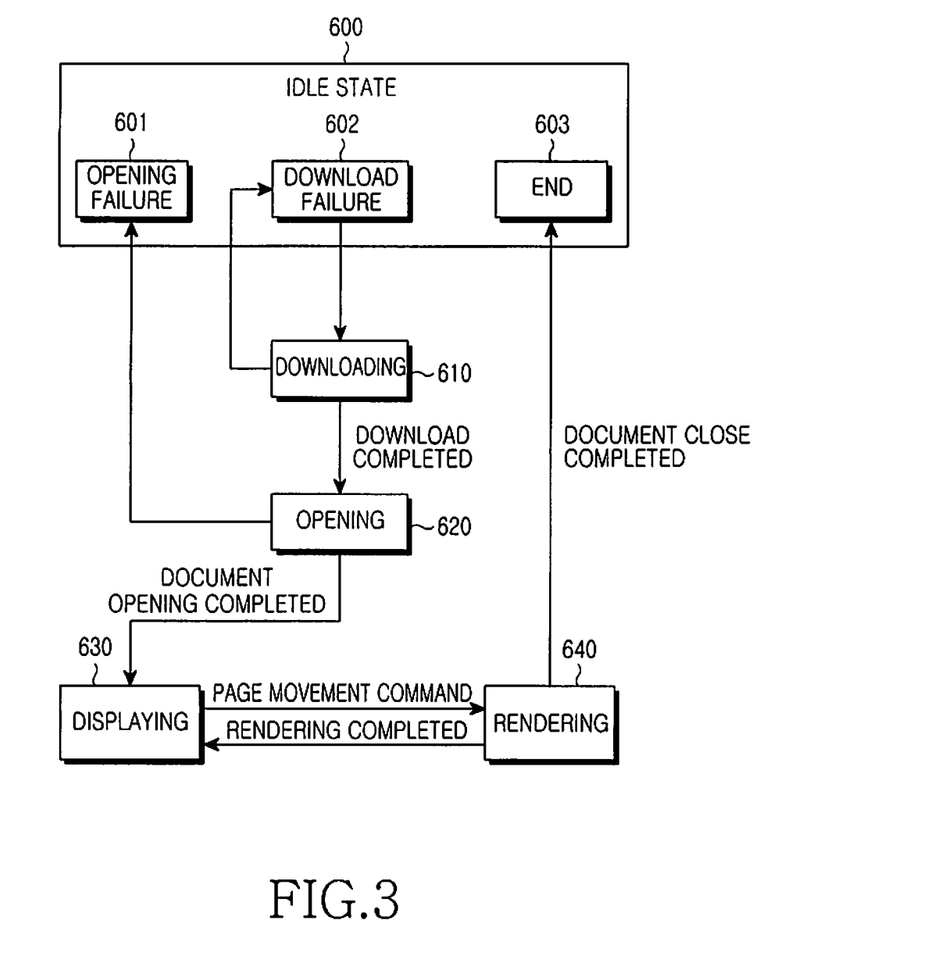
FIG. 3 is a diagram illustrating a flowchart illustrating the operation state change of a document viewer service module according to an embodiment of the present invention.

FIG. 3 is a diagram illustrating a flowchart illustrating the operation state change of a document viewer service module according to an embodiment of the present invention.

When the document viewer service module 210 is in an idle state, such as in step 600, and if a document content download command is received from the control point 100, the operation state changes to "document downloading," in step 610. If the downloading is completed, the document viewer service module 210 changes the operation state to "document opening" for analyzing the contents of the downloaded document, in step 620. If the download fails during the download in step 610, a "download fail" operation is performed in step 602, and the operation state is changed to the idle state in step 600. If the "document open" operation fails during the "document opening" operation in step 620), the "opening fail" operation is performed in step 501, and the operation state is changed to the idle state in step 600.

If the document is completely opened after the analysis of the downloaded document, the document viewer service module 210 changes the operation state to "displaying" and the analyzed document contents are displayed, in step 630.

If a command for page movement is received during display of the document, the document viewer service module 210 changes the operation state to "rendering" and renders the previous or next page of the document, or alternatively renders a specified page of the document. If a document close command is received during the "displaying" step 630 or "rendering" step 640, the document viewer service module 210 performs an "ending" operation in step 603. Then, operation state is changed to the idle state, in step 600.

Thereafter, if the rendering is completed, the operation state of the document viewer service module 210 is changed again to the "displaying" state, in step 630.

The operation state change of the document viewer service module 210 is controlled by the user through the key input unit 150 of the control point 100. For such control, the document viewer service module 210 may display, through the display 250, an interface screen for controlling, such as a command for document download LoadDocument( ), a command for document close CloseDocument( ), a command for moving to the next page Next( ), a command for moving to the previous page Previous( ), and a command for page movement PageJump( ).

Through the above-described commands, the document viewer service module 210 transfers state notification information including the operation state information such as file open, close, next page movement, previous page movement, page movement, etc., to the control point 100. In this case, schema for the state notification information transferred to the control point 100 is as shown in Table 1 below.

TABLE 1

```
<!--========================================================
DrawingState
=========================================================-->
<xsd:element name="DrawingState">
 <xsd:complexType>
  <xsd:attribute name="val" use="required">
   <xsd:simpleType>
    <xsd:restriction base="xsd:string">
     <xsd:enumeration value="OpenFail"/>
     <xsd:enumeration value="Downloading"/>
     <xsd:enumeration value="DownloadFail"/>
     <xsd:enumeration value="Opening"/>
     <xsd:enumeration value="Rendering"/>
     <xsd:enumeration value="Displaying"/>
     <xsd:enumeration value="End"/>
    </xsd:restriction>
   </xsd:simpleType>
  </xsd:attribute>
 </xsd:complexType>
</xsd:element>
<!--========================================================
TotalPage
=========================================================-->
<xsd:element name="TotalPage">
 <xsd:complexType>
  <xsd:attribute name="val" type="xsd:unsignedInt"use="required"/>
 </xsd:complexType>
</xsd:element>
<!--========================================================
CurrentPage
=========================================================-->
<xsd:element name="CurrentPage">
 <xsd:complexType>
  <xsd:attribute name="val" type="xsd:unsignedInt"use="required"/>
 </xsd:complexType>
</xsd:element>
<!--========================================================
CurrentResourceTitle
=========================================================-->
<xsd:element name="CurrentResourceTitle">
 <xsd:complexType>
  <xsd:attribute name="val" type="xsd:string"use="required"/>
 </xsd:complexType>
</xsd:element>
```

The state notification information LastChange refers to information transferred when a specified event occurs or a specified value is changed in the UPnP related appliances and it is necessary to inform a control device, such as the control point 100, of such occurrence or change.

The document viewer service module 210 transfers state notification information, such as the current page number of the document content, the total number of pages, the title of the document content, the operation state information (document open failure, downloading, download failure, document opening, document image generating, document displaying, etc.) of the media renderer, to the control point 100. In this case, in accordance with the state notification information to be transferred, the document viewer service module 210 performs imaging of the document content page that is being output to the display 250 of the media renderer 200, and transfers the imaged document content page to the control point 100.

A process of imaging a document content page as described above is described in more detail with reference to FIGS. 4A and 4B.

Figure 4A:
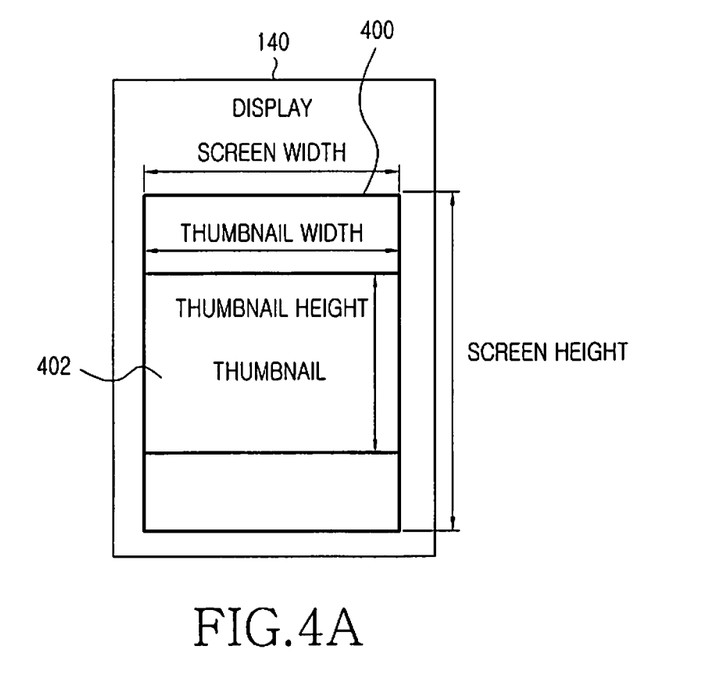
FIGS. 4A and 4B are diagrams illustrating a process in which a document viewer service module images a document content page according to an embodiment of the present invention.
Figure 4B:
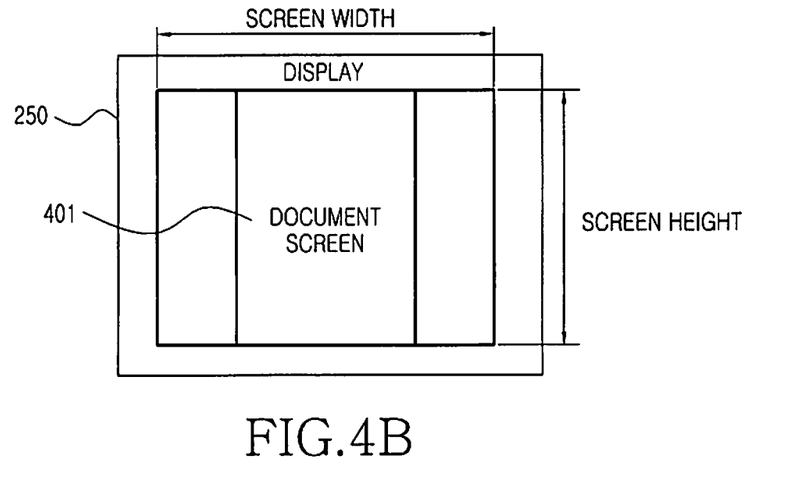

FIGS. 4A and 4B are diagrams illustrating a process in which a document viewer service module images a document content page according to an embodiment of the present invention. More specifically, FIG. 4A is a diagram illustrating the display 140 of the control point 100, and FIG. 4B is a diagram illustrating the display 250 of the media renderer 200.

The control unit 100 has a screen size as indicated by a reference numeral 400. If a request for displaying the document content is received, the control unit 100 transfers the command for displaying the document content and the information on the screen size of the display 140 to the media renderer 200.

The document viewer service module 210 of the media renderer 200 generates thumbnail information that includes a screen width and a screen height for the largest document image within a range that does not exceed the screen width and the screen height of the display screen 140 of the control point 100 while maintaining the aspect ratio of the document content screen 401 being displayed on the display unit 250. Thereafter, the document viewer service module 210 generates thumbnail image data 402 composed of the thumbnail information.

In this case, the schema for the thumbnail generated by the document viewer service module 210 is as shown in Table 2 below.

TABLE 2

```
<action>
 <name>GetThumb</name>
 <argumentList>
  <argument>
   <name>InstanceID</name>
   <direction>in</direction>
   <relatedStateVariable>A_ARG_TYPE_InstanceID
   </relatedStateVariable>
  </argument>
  <argument>
   <name>ClientRect_MaxWidth</name>
   <direction>in</direction>
   <relatedStateVariable>ClientWidth</relatedStateVariable>
  </argument>
  <argument>
   <name>ClientRect_MaxHeight</name>
   <direction>in</direction>
   <relatedStateVariable>ClientHeight</relatedStateVariable>
  </argument>
  <argument>
   <name>Compress_Method</name>
   <direction>in</direction>
   <relatedStateVariable>CompressMethod</relatedStateVariable>
  </argument>
  <argument>
   <name>Display_Width</name>
   <direction>out</direction>
   <relatedStateVariable>Integer</relatedStateVariable>
  </argument>
  <argument>
   <name>Display_Height</name>
   <direction>out</direction>
   <relatedStateVariable>Integer</relatedStateVariable>
  </argument>
  <argument>
   <name>Thumb_Width</name>
   <direction>out</direction>
   <relatedStateVariable>Integer</relatedStateVariable>
  </argument>
```

TABLE 2-continued

```
<argument>
  <name>Thumb_Height</name>
  <direction>out</direction>
  <relatedStateVariable>Integer</relatedStateVariable>
</argument>
<argument>
  <name>Thumb_ColorDepth</name>
  <direction>out</direction>
  <relatedStateVariable>ColorDepth</relatedStateVariable>
</argument>
<argument>
  <name>Thumb_EncodedData</name>
  <direction>out</direction>
  <relatedStateVariable>Data</relatedStateVariable>
</argument>
</argumentList>
</action>
```

In order to transfer the thumbnail image data generated in the above-described method to the control point 100, the document viewer service module 210 provides, to the control point 100, a compression algorithm in which the thumbnail image generated by the document viewer service module itself has been compressed. In this case, the provided compression algorithm is as shown in Table 3 below.

TABLE 3

```
<stateVariable sendEvents="no">
  <name>CompressMethod</name>
  <dataType>string</dataType>
  <allowedValueList>
    <allowedValue>none</allowedValue>
    <allowedValue>zlib</allowedValue>
  </allowedValueList>
</stateVariable>
```

If the control point 100 has a decompression algorithm corresponding to the compression algorithm provided from the document viewer service module, the document viewer service module can select the compression type for compressing the image data when the thumbnail information and the thumbnail image data are generated. Through this compression, the document viewer service module can generate the thumbnail image data with a small image data size.

The rendering control service module 220, the connection manager service module 230, and the audio/video transfer service module 240 perform general operations in the media renderer, and thus a detailed explanation of the operations of these elements is omitted for clarity and conciseness.

The display 250 displays the document content in accordance with the document content image display request.

The media server 300 includes a content directory service module 310 (or processor), a document meta information extracter 320, and a connection manager service module 330.

The content directory service module 310 reads and stores the requested document content among the document contents stored in a local disc memory.

The content directory service module 310 provides the requested document content in accordance with the request.

The meta information extracter 320 generates meta information that includes resource information of the document content stored in the content directory service module 310.

The connection manager service module 330 performs operations similar to operations of a general connection manager service module, and thus a detailed explanation thereof is omitted for clarity and conciseness.

As described above, according to embodiments of the present invention, since the media renderer 300 provides, to the control point 100, the thumbnail image data of the document content as displaying the requested document contents on a screen of the control point 100 in accordance with the document content display request, a plurality of control points that are connected to one image renderer, can subscribe the thumbnail image data together, and perform the structure suitable to the presentation scenario.

Figure 5:
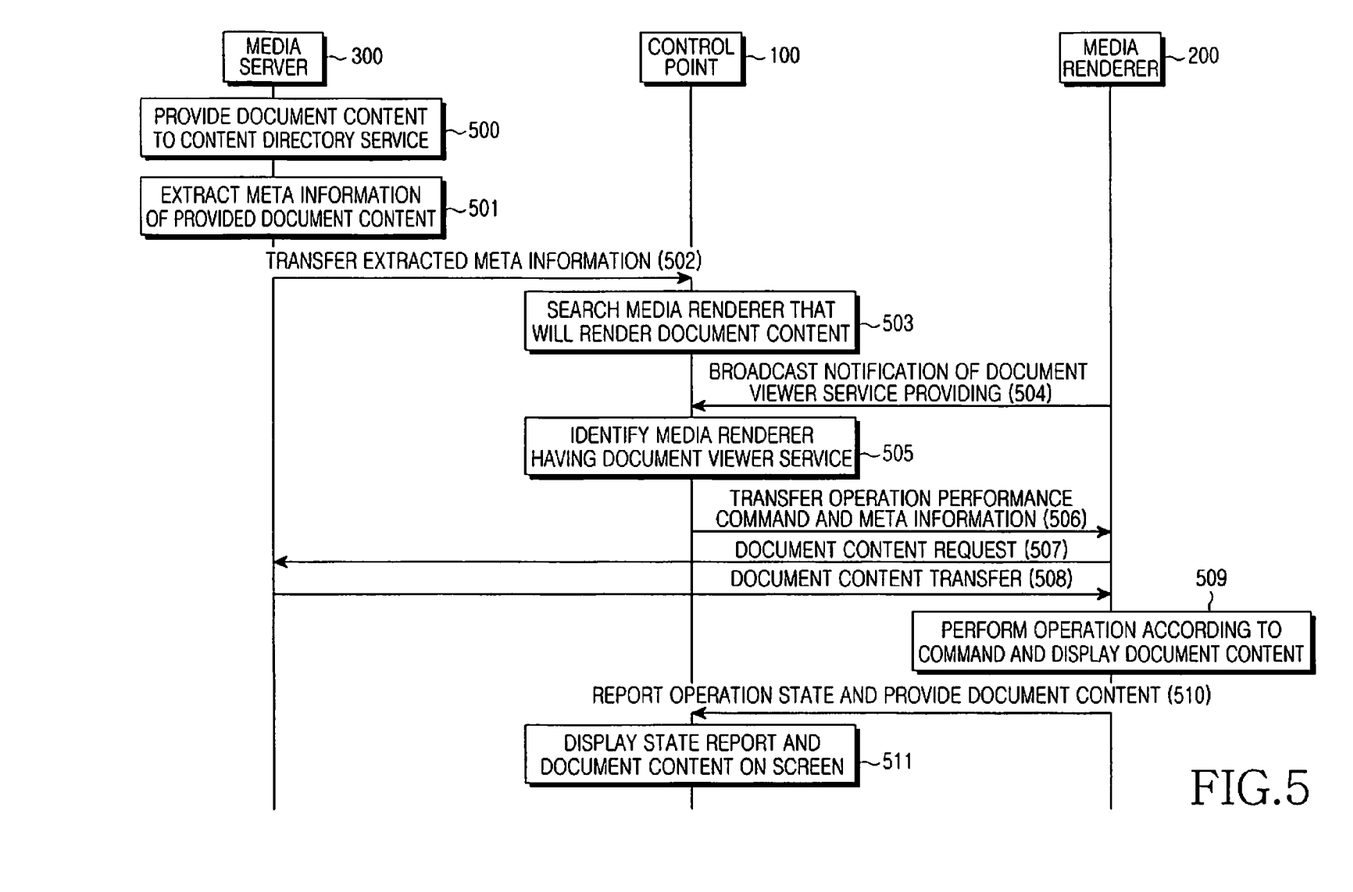
FIG. 5 is a diagram illustrating a process in which a document content display system displays document content requested by a user on a screen according to an embodiment of the present invention.

FIG. 5 is a diagram illustrating a process in which a document content display system displays document content requested by a user on a screen according to an embodiment of the present invention.

According to embodiments of the present invention, the control point 100 and the media server 300 may be configured together as one device.

Referring to FIG. 5, in step 500, if a user inputs a request for displaying document content through the key input unit 150 of the control point 100, the media server 300 provides the document content stored in the memory to the content directory service module 310.

In steps 501 and 502, the media server 300 extracts meta data of the document content provided through the document meta information extracter 320. In the present example, the meta data includes a plurality of information related to the document content, such as the title of the document content, the number of pages, an author, etc.

In step 502. the media server 300 transfers the extracted media information to the control point 100.

In step 503, the control point 100 searches the media renderer 300 that can render the meta information. In this case, the media renderer 200 informs the neighboring appliances that the media renderer 200 itself is providing the document viewer service by generating and broadcasting a notification message.

If the notification message is received from the media renderer 200 in step 504, the control point 100, in step 505, identifies whether the media renderer 200 that has transferred the notification information through the document viewer service notification listener 220 is the media renderer having the document viewer service.

If it is confirmed that the media renderer 200 has the document viewer service, in step 506, the control point 100 transfers the operation performance command for displaying the document content, the meta data received from the media server 300, and the display information of the display 140 to the media renderer 200.

In step 507, the media renderer 200 requests the document content that corresponds to the received meta data from the media server 300, and in step 508, the media server 300 transfers the requested document content.

In step 509, the media renderer 200 displays the document content received from the media server 300 on a screen. In this case, the media renderer 200 generates a document content image suitable to the display unit 140 of the control point 100.

In step 510, the media renderer 200 generates the state notification information indicating the operation state according to the operation performance command, and transfers the state notification information to the control point together with the thumbnail data in which the document content page being output to the display 250 has been adjusted to suit the display screen of the control point 100.

In step 511, the control point 100 displays the state notification information received from the media renderer 200 on the display 140, and displays the received thumbnail data on the display 140. For example, if a user inputs a request for displaying the next page of the document through the key input unit 150, the control point 100 transfers a command for displaying the next page of the document. If information indicating the rendering state for displaying the next page of the document is received from the media renderer 200, the control point 100 displays the received information on the display. If the thumbnail data that corresponds to the next page of the document is received, the control point displays the received thumbnail data on the display.

As described above, according to the present invention, since the document content is displayed in the UPnP network environment, the document content display function can be easily used, even in wireless communication environments such as Wireless Fidelity (Wi-Fi), and the operation standard may be applied to appliances on the UPnP network.

While the operation and configuration of the method and apparatus for controlling a home network system using a mobile terminal have been shown and described with reference to certain embodiments thereof, it will be understood by those skilled in the art that various changes in form and details may be made therein without departing from the spirit and scope of the invention as defined by the appended claims.

What is claimed is:

1. A device that displays document content, comprising:
    a display including a screen that displays a document content image; and
    a processor that receives a key input via keys is configured to:
    identify a media renderer that can render and display requested document content on a display included in the media renderer based on a notification message that is broadcast by the media render for informing neighboring devices that the media renderer provides a document viewer service and that is received by the device,
    generate an operation state command associated with the document content in accordance with a user input;
    transfer, to the identified media renderer via a wireless network, the generated operation state command, meta information provided from a media server, and size information of the screen indicating a width and a height of the screen, wherein the device and the media renderer are connected via the wireless network; and
    receive last change event information corresponding to an operation performed by the media renderer in accordance with the operation state command and a document thumbnail image corresponding to at least one page of the document content being displayed by the media renderer via the wireless network;
    display the document thumbnail image corresponding to the at least one page of the document content on the screen, while the at least one page of the document content is displayed by the media renderer,
    wherein the document thumbnail image is generated, based on the size information by the media renderer, within a range that does not exceed the width and the height of the screen while maintaining an aspect ratio of the at least one page of the document content being displayed by the media renderer.

2. The device that displays document content as claimed in claim 1, wherein the processor displays the received last change event information on the screen.

3. The device that displays document content as claimed in claim 1, wherein the processor is further configured to receive a compression algorithm used for decompressing the document thumbnail image from the media renderer via the wireless network.

4. A device that displays document content, comprising:
    a display including a screen that displays at least one page of a document content; and
    a processor that receives a key input via keys is configured to:
    generate a notification message that is broadcast by the device for informing neighboring devices that the device provides a document viewer service and that is received by a control point of a neighboring device;
    receive an operation state command, meta information and a size information of the screen included in the control point indicating a width and a height of the screen, from the control point via a wireless network, wherein the device and the control point are connected via the wireless network;
    download requested document content that corresponds to the meta information from a media server and display at least one page of the requested document content on the screen;
    perform an operation associated with the requested document content in accordance with the operation state command;
    generate last change event information corresponding to a state of the performed operation;
    generate a document thumbnail image corresponding to the at least one page of the requested document content being displayed on the screen, within a range that does not exceed the width and the height of the screen included in the control point while maintaining an aspect ratio of the at least one page of the requested document content being displayed on the screen, based on the size information;
    transfer the last change event information and the document thumbnail image to the control point via the wireless network; and
    wherein the document thumbnail image corresponding to the at least one page of the document content is displayed on the screen included in the control point, while the at least one page of the document content is displayed on the screen.

5. The device that displays document content as claimed in claim 4, wherein the media server comprises:
    a processor configured to:
    search and provide the requested document content;
    generate meta information that includes resource information corresponding to the searched document content; and
    provide the meta information to the control point.

6. The device that displays document content as claimed in claim 4, wherein the processor is further configured to generates a compression algorithm used for decompressing the document thumbnail image and transfers the compression algorithm to the control point via the wireless network.

7. A method for displaying document content in a device, comprising the steps of:
    identifying a media renderer that can render and display requested document content on a display included in the media renderer, based on a notification message that is broadcast by the media render for informing neighboring devices that the media renderer provides a document viewer service and that is received by the device;
    generating an operation state command associated with the document content in accordance with a user input;

transmitting, to the identified media renderer via a wireless network, the generated operation state command, meta information provided from a media server, and size information of the screen included in the device indicating a width and a height of the screen, wherein the device and the media renderer are connected via the wireless network, and receiving last change event information corresponding to an operation performed by the media renderer in accordance with the operation state command and a document thumbnail image corresponding to at least one page of the document content being displayed by the media renderer via a wireless network displaying the document thumbnail image corresponding to the at least one page of the document content on the screen, while the at least one page of the document content is displayed by the media renderer, wherein the document thumbnail image is generated, based on the size information by the media renderer, within a range that does not exceed the width and the height of the screen while maintaining an aspect ratio of the at least one page of the document content being displayed by the media renderer.

8. The method for displaying document content as claimed in claim 7, further comprising, displaying the received last change event information on the screen.

9. The method for displaying document content as claimed in claim 7, further comprising, receiving a compression algorithm used for decompressing the document thumbnail image from the media renderer via the wireless network.

10. A method for displaying document content in a device, comprising the steps of:

generating a notification message that is broadcast by the device for informing neighboring devices that the device provides a document viewer service and that is received by a control point of a neighboring device;

receive an operation state command, meta information and a size information of the screen included in the control point indicating a width and a height of the screen, from the control point via a wireless network, wherein the device and the control point are connected via the wireless network;

downloading, from a media server, requested document content corresponding to the meta information and displaying at least one page of the requested document content on a display of the device;

performing an operation associated with the requested document content in accordance with the operation state command;

generating last change event information corresponding to a state of the performed operation;

generating a document thumbnail image corresponding to the at least one page of the requested document content being displayed on the display, within a range that does not exceed the width and the height of the screen included in the control point while maintaining an aspect ratio of the at least one page of the requested document content being displayed on the display, based on the size information; and transferring the last change event information and the document thumbnail image to the control point via the wireless network, wherein the document thumbnail image corresponding to the at least one page of the document content is displayed on the screen included in the control point while the at least one page of the document content is displayed on the screen.

11. The method for displaying document content as claimed in claim 10, further comprising:

searching, by the media sever, for the document content corresponding to the meta information; and generating, by the media server, meta information that is resource information corresponding to the searched document content and providing the meta information to the control point.

12. The method for displaying document content as claimed in claim 10, further comprising:

generating a compression algorithm used for decompressing the document thumbnail image; and transferring the compression algorithm to the control point via the wireless network.

\* \* \* \* \*